United States Patent [19]
Kurosawa et al.

[11] Patent Number: 5,504,895
[45] Date of Patent: Apr. 2, 1996

[54] METHOD OF MANAGING DATA STRUCTURE CONTAINING BOTH PERSISTENT DATA AND TRANSIENT DATA

[75] Inventors: Takahiro Kurosawa; Masahiko Yoshimoto; Shigeki Shibayama, all of Yokohama; Ryuhei Uehara, Kawasaki, all of Japan

[73] Assignee: Canon Kabushiki Kaisha, Tokyo, Japan

[21] Appl. No.: 35,572

[22] Filed: Mar. 23, 1993

[30] Foreign Application Priority Data

Mar. 24, 1992 [JP] Japan ................................. 4-066036
Mar. 24, 1992 [JP] Japan ................................. 4-066042

[51] Int. Cl.⁶ ............................. G06F 9/46; G06F 17/30
[52] U.S. Cl. .................. 395/650; 395/600; 364/DIG. 1; 364/281.3; 364/282.1
[58] Field of Search ................................. 395/600, 425, 395/650, 700, 400, 474

[56] References Cited

U.S. PATENT DOCUMENTS

| | | | |
|---|---|---|---|
| 4,511,964 | 4/1985 | Georg et al. | 395/400 |
| 4,814,971 | 3/1989 | Thatte | 395/575 |
| 4,989,134 | 1/1991 | Shaw | 395/425 |
| 5,057,996 | 10/1991 | Cutler et al. | 395/650 |
| 5,129,083 | 7/1992 | Cutler et al. | 395/600 |
| 5,136,712 | 8/1992 | Perazzoli, Jr. et al. | 395/700 |
| 5,247,669 | 9/1993 | Abraham et al. | 395/600 |
| 5,295,256 | 3/1994 | Bapat | 395/500 |
| 5,297,279 | 3/1994 | Bannon et al. | 395/600 |
| 5,386,525 | 1/1995 | Noack | 395/600 |

*Primary Examiner*—Paul V. Kulik
*Attorney, Agent, or Firm*—Fitzpatrick, Cella, Harper & Scinto

[57] ABSTRACT

According to a data management method of managing shared data which is shared by a plurality of processes and data inherent in a process which exists during execution of one particular process and disappears when the process is finished, when each process fetches shared data from a data base into a memory, whether the shared data requires data inherent in the process is checked. Any inherent data of the process is determined, if necessity for that data is determined. The determined inherent data of the process is stored in the memory. A pointer for the inherent data of the process, which is stored in the memory, is stored into the fetched shared data in accordance with attributes inherent in the process requiring the inherent data of the process.

18 Claims, 17 Drawing Sheets

FIG. 11

```
class Circle                                        ··· 111
begin
    persistent-instance-variables:                  ··· 112
        x-center            : Dimension;
        y-center            : Dimension;
        radius              : Dimension;
        color               : ^Color;

transient-instance-variables:                   ··· 113
        pen                 : Pen
        windows             : ^WindowList;

persistent-class-variables:                     ··· 114
        num-of-Circles      : Integer;

transient-class-variables:                      ··· 115
        window-system       : ^WindowSystem;

instance-methods:                               ··· 116
        display             : Void;
        set-x(x : Dimension) : ^Circle;
        set-y(y : Dimension) : ^Circle;
        set-r(r : Dimension) : ^Circle;
        set-c(c : ^Color)   : ^Circle;
        changed             : Void;
        destroy             : Void;

class-methods:                                  ··· 117
        create(x : Dimension,
               y : Dimension,
               r : Dimension,
               c : ^Color)  : ^Circle;

end;
```

METHOD OF MANAGING DATA STRUCTURE CONTAINING BOTH PERSISTENT DATA AND TRANSIENT DATA

BACKGROUND OF THE INVENTION

1. Field of the Invention

The present invention relates to a method of sharing data without any conflict in executing applications in which persistent data present in a data base and transient data, each of which exists only during execution of a certain application and disappears when the application is finished, are entangled intricately, such as in multimedia data processing.

2. Related Background Art

Generally, data base applications contain both objects (to be referred to as persistent objects hereinafter) which are present in a data base, shared by a plurality of applications, and used continuously, and transient objects (to be referred to as vaporizable objects hereinafter) each of which exists during execution of a certain application and disappears with the application process.

The "object" includes conventional record data or the tuple of an associative data base and indicates a general data structure that can be processed as a group of data having a single meaning.

An application making use of a data base generally contains both persistent objects and vaporizable objects. In an application of this type, particularly a situation in which a persistent object points to a vaporizable object by using a link or the like takes place. In such a situation, when the vaporizable object disappears with closing of the application process, the persistent data structure including the vaporizable object suffers a loss of data, losing its meaning as a whole.

As an example, assume that a graphic pattern is drawn by using a bit-map display and a mouse, and the sketch data formed is managed using a data base. In this case, communication information, such as a resource identifier including font information and color information used to display the sketch data, with respect to a window server, is a vaporizable object. Since these color information and font information disappear when the application is finished, the meaning as the sketch data is lost.

Conventionally, to avoid the above problem arising because two different types of objects exist, persistent objects to be stored in a computer by using a data base system are stored by describing only relationships with data to be stored in that data base without describing relationships with vaporizable objects. That is, an explicit or implicit reference relationship of data stored in the data base is closed in the data base in this sense, and this keeps the consistency of the data base. To keep this consistency, in a typical associative data base system, storage of the relationships between persistent objects and vaporizable objects is inhibited.

For this reason, an application requiring description of the relationship between a persistent object and a vaporizable object requires processing of copying a persistent object in a memory space of the application and describing the relationship between the persistent object copied and a vaporizable object. Conventionally, application programmers describe this procedure.

Such description of an application will be explained in detail below by taking processing, which performs data base management for sketch data to be displayed by using the X Window system, another common window system in workstations, as an example. In the X Window system, sketch data to be displayed in a window contains communication information (such as a resource identifier including font information and color information) used to communicate with a window server for actually displaying the data. In this system, a connection to the window server is established for each individual application process. Therefore, the communication information of one application process with respect to the window server is different from another, and in this sense, the communication information is a vaporizable object. The sketch data, therefore, has a vaporizable object as its attribute. This system, on the other hand, is to manage the sketch data in the window by using a data base, and so this part of the processing corresponds to a persistent object. In such a system, the following procedure is conventionally used to avoid mixing of persistent objects and vaporizable objects.

(1) A data structure to be stored in the data base is separated from a data structure to be stored in an application process such that only data inherent in a graphic pattern to be sketched, i.e., data except a vaporizable object, such as communication information with respect to the window server, is extracted from sketch data and stored in the data base.

(2) When the application process is to make use of the sketch data, the data structure of graphic data containing the communication information is acquired, and the data fetched from the data base is embedded in the data structure, thereby forming a replica of the sketch data. Communication information with respect to the window server is established for this replica.

Application programmers must describe the above procedure by themselves.

For this reason, to add procedures or make changes in data models, that are unnecessary in programming of applications using no data base, application programmers must create a program for processing persistent objects and vaporizable objects without any conflict between them for each individual application. The result is a reduction in productivity of application programming.

SUMMARY OF THE INVENTION

It is, therefore, an objective of the present invention to eliminate the above conventional drawbacks and to provide a data management method capable of easily processing a data structure containing both persistent data and transient data without any conflict.

It is another objective of the present invention to provide a data management method capable of reducing the load of programming on programmers who program application software for processing a data structure containing both persistent data and transient data.

It is still another objective of the present invention to provide a data management method capable of easily ensuring the consistency of data in a data structure containing both data shared by a plurality of applications and data inherent in each individual application.

According to one aspect, the present invention which achieves these objectives relates to a data management method of managing shared data which is shared by a plurality of processes and data which exists during execution of one particular process and disappears when the process is finished, comprising the steps of checking, when each process fetches shared data from a data base into a memory, whether the shared data requires data inherent in the process, determining the inherent data of the process if necessity for the data is determined, storing the determined inherent data of the process in the memory, and storing a pointer for the inherent data of the process, which is stored in the memory, into the fetched shared data in accordance with attributes inherent in the process requiring the inherent data of the process.

According to another aspect, the present invention which achieves these objectives relates to a data management method of managing shared data which is shared by a plurality of processes and data which exists during execution of one particular process and disappears when the process is finished, comprising the steps of storing data inherent in each process, which the process requires in relation to shared data in a data base, into a memory, storing an identifier of the inherent data of each process in shared data in accordance with attributes inherent in the process, reading out, when each process makes reference to the shared data in the data base, the identifier stored in the shared data in accordance with the inherent attributes of the process, and designating necessary data inherent in the process in the memory in accordance with the readout identifier.

According to still another aspect, the present invention which achieves these objectives relates to a data management method of managing shared data which is shared by a plurality of processes and data which exists during execution of one particular process and disappears when the process is finished, comprising the steps of forming data inherent in each process, which the process requires in relation to shared data in a data base, storing the formed inherent data of each process in a memory, registering an identifier of each process in a one-to-one correspondence with a pointer for the inherent data of the process, which data is stored in the memory, to a registration table for each shared data, and referring to the registration table, when each process makes reference to the shared data, thereby designating the inherent data of the process.

According to other aspect, the present invention which achieves these objectives relates to a data management method of managing shared data which is shared by a plurality of processes and data which exists during execution of one particular process and disappears when the process is finished, comprising the steps of forming data inherent in each process, which the process requires in relation to shared data in a data base, storing the formed inherent data of each process in a memory, registering an identifier of each process in a one-to-one correspondence with a pointer for the inherent data of the process, which data is stored in the memory, to a registration table common to a plurality of shared data, and referring to the registration table, when each process makes reference to the shared data, thereby designating the inherent data of the process.

According to other aspect, the present invention which achieves these objectives relates to a data management method of managing shared data which is shared by a plurality of processes and data which exists during execution of one particular process and disappears when the process is finished, comprising the steps of forming data inherent in each process, which the process requires in relation to shared data in a data base, storing the formed inherent data of each process in a memory, registering an identifier of each process in a one-to-one correspondence with a pointer for the inherent data of the process, which data is stored in the memory, to an inherent registration table of the process, and referring to the registration table, when each process makes reference to the shared data, thereby designating the inherent data of the process.

Other objectives and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 11 is a view showing class definition for explaining definition of a semi-persistent object;

DESCRIPTION OF THE PREFERRED EMBODIMENTS

The embodiments of the present invention will be described in detail below with reference to the accompanying drawings.

In this embodiment, data base management for sketch information in a sketch tool application of the X Window system will be described.

In the following description, a transient object which is linked from a persistent object and disappears when a process is finished will be called a "vaporizable object", and the link pointing to the vaporizable object from the persistent object will be called a "vaporizable pointer."

Figure 7:
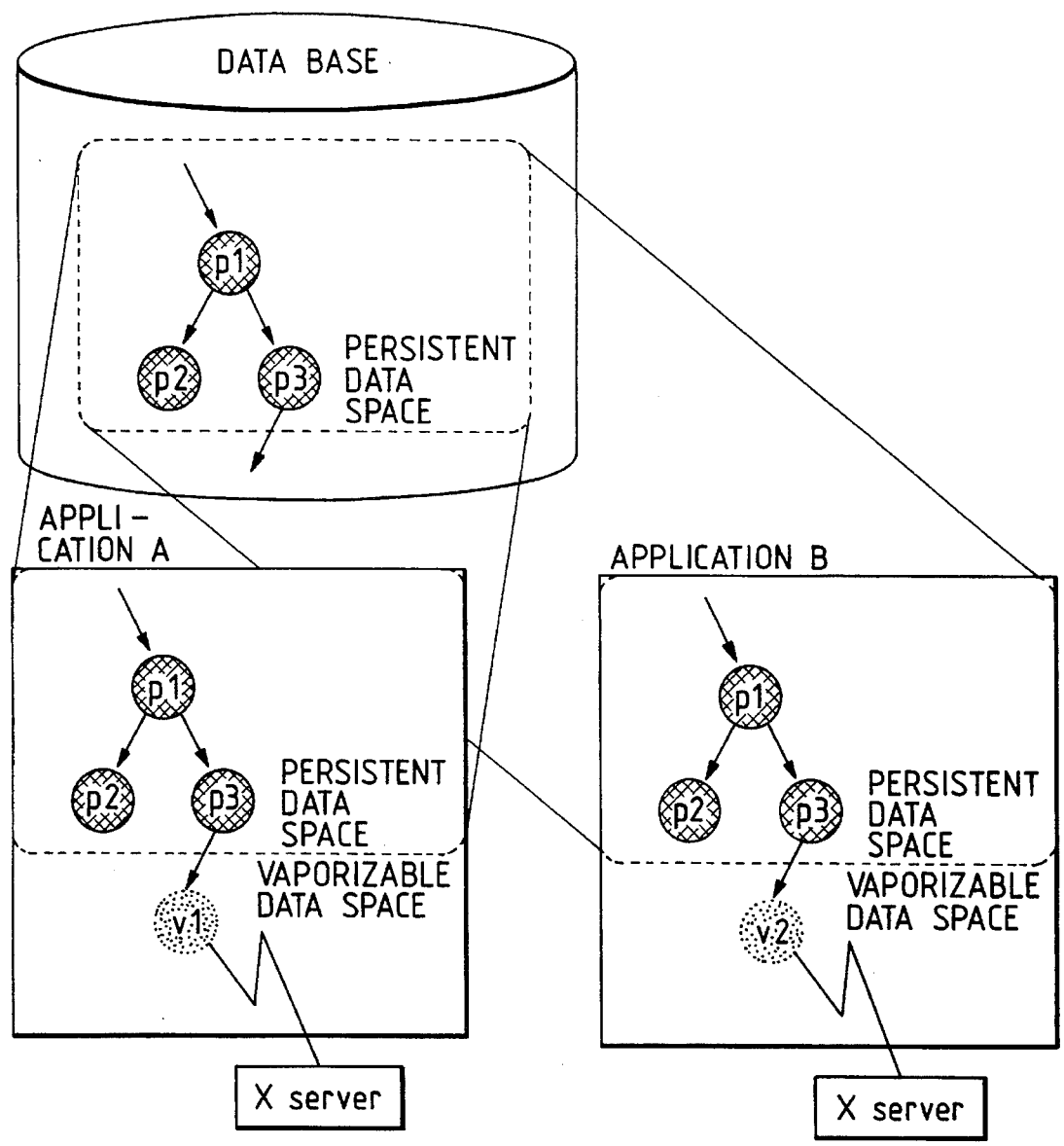
FIG. 7 is a view showing memory mapping.

As shown in FIG. 7, persistent data shared in this system is mapped in each application and used in a memory space similar to that for vaporizable data inherent in the application.

The persistent data to be shared is mapped in units of objects (groups of significant data) already described above. Mapping is controlled such that the relationship between objects is kept consistent in each individual application.

In situations where "both persistent data to be shared and vaporizable data inherent in an application can be used in similar memory spaces" as described above, the present invention solves the problem of disappearance of vaporizable data occurring when certain persistent data points to the vaporizable data.

Figure 1:
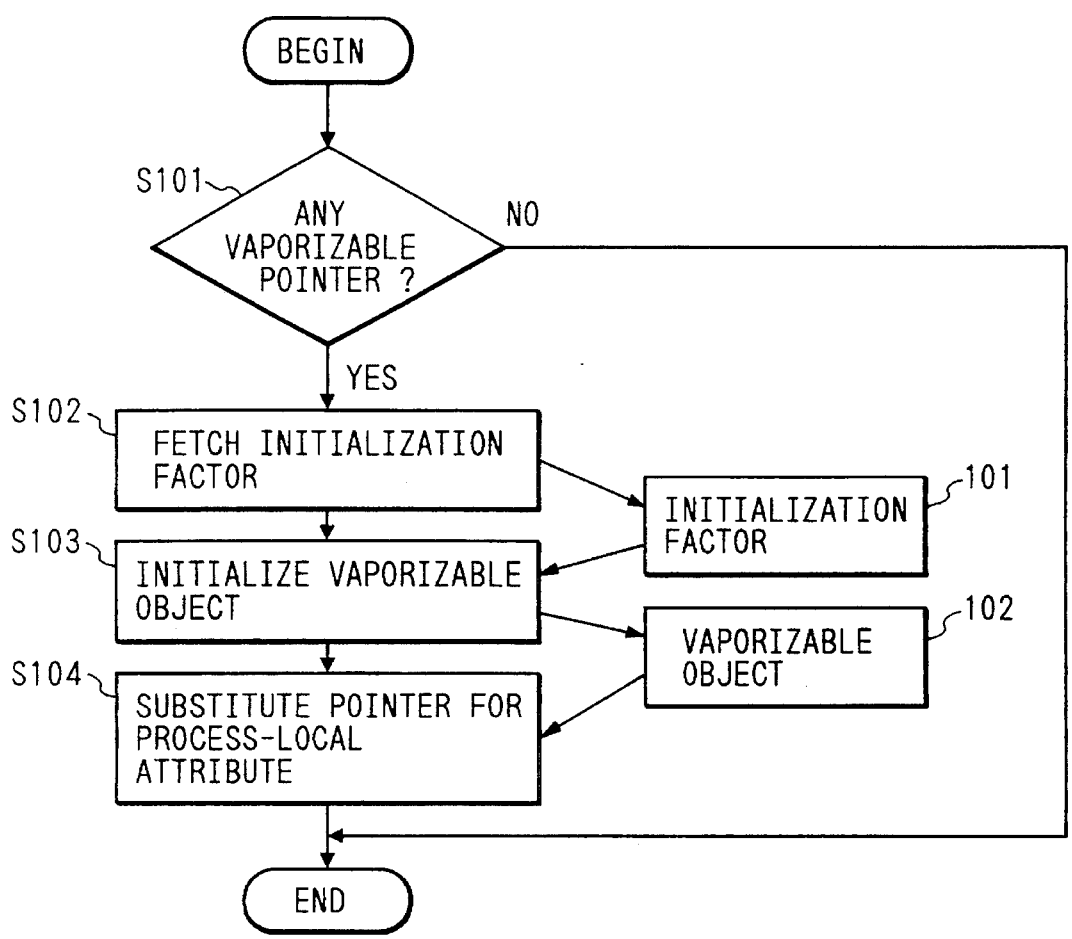
FIG. 1 is a flow chart showing processing of referring to an object containing a vaporizable object according to the first embodiment of the present invention.

FIG. 1 is a flow chart showing processing of referring to an object containing a vaporizable object according to this embodiment.

Figure 2:
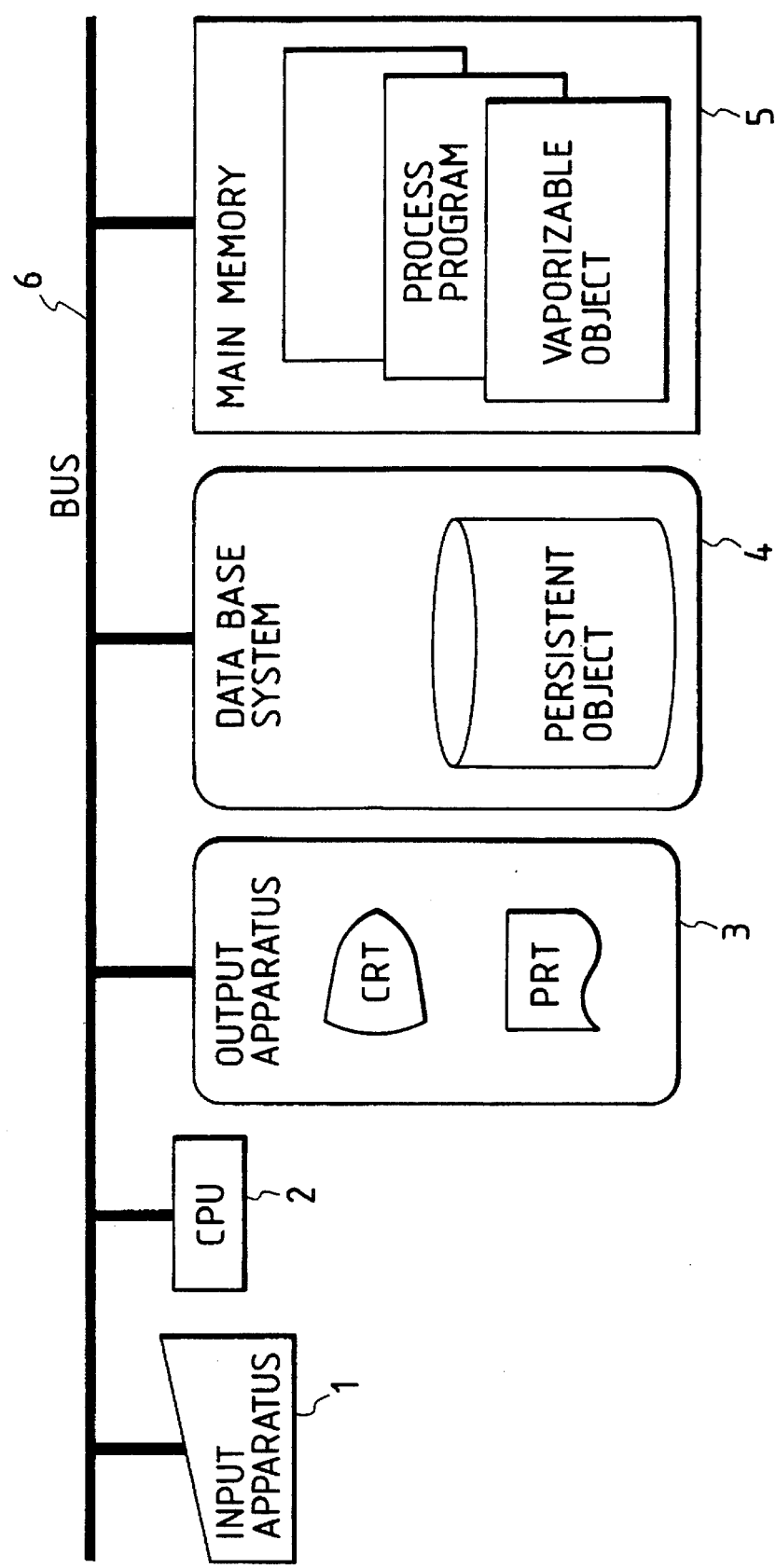
FIG. 2 is a block diagram showing the arrangement of a system according to the first embodiment of the present invention.

FIG. 2 is a block diagram showing the arrangement of a system according to this embodiment. Referring to FIG. 2, an input apparatus 1 is, e.g., a keyboard or a mouse through which a user of this sketch tool enters commands or data into the sketch tool.

A CPU 2 of a processor performs the processing of this embodiment on the basis of the input commands from the input apparatus 1. The CPU 2 executes procedures stored in a memory to be described later.

An output apparatus 3 is, e.g., a printer or a CRT display for printing out or displaying processing results from the CPU 2 or messages from the sketch tool.

A data base system 4 for storing and managing sketch data is, e.g., an object oriented data base and also stores initialization factors to be described later.

Figure 3:
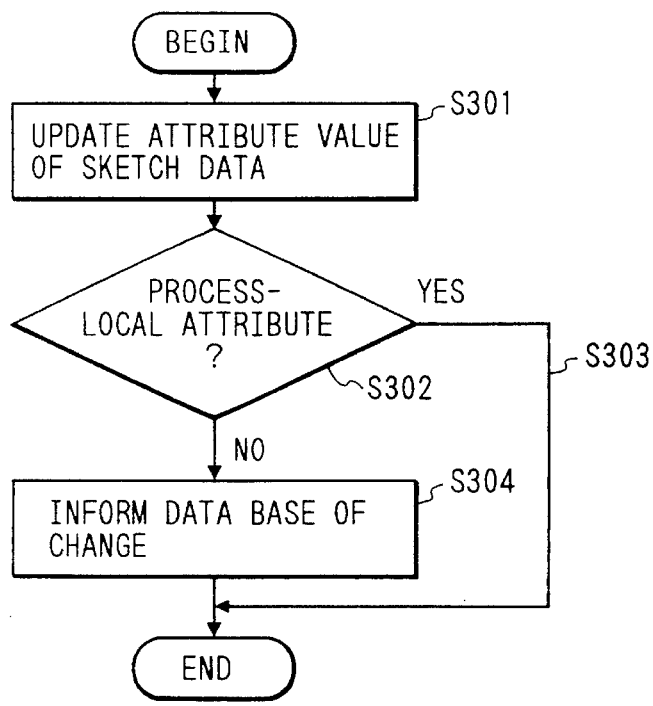
FIG. 3 is a flow chart showing processing of updating an object containing a vaporizable object according to the first embodiment.
Figure 4:
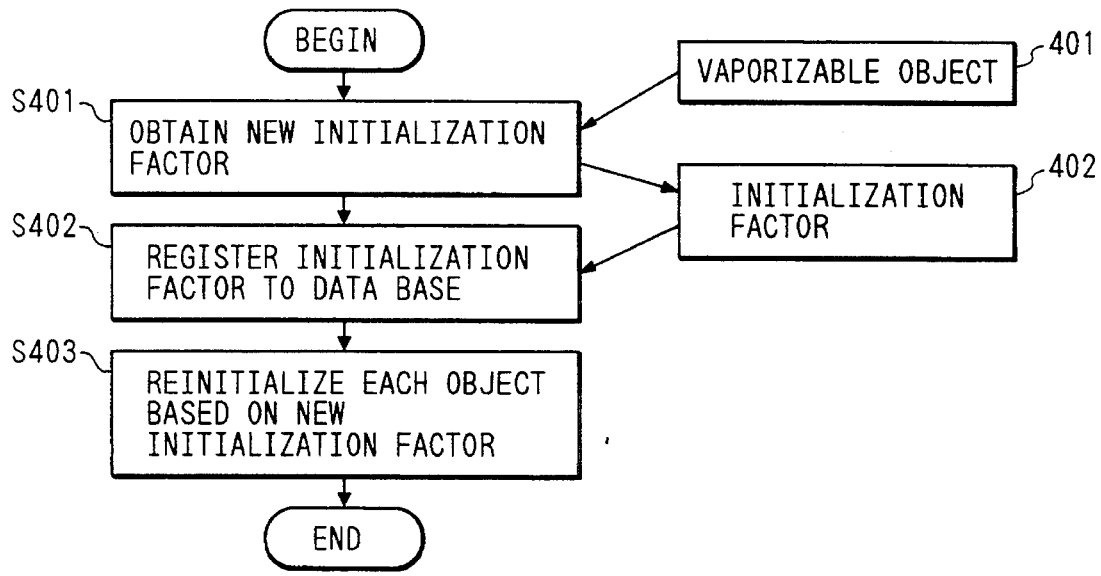
FIG. 4 is a flow chart showing processing of updating a vaporizable object according to the first embodiment.

A memory 5 is used as a main memory for temporarily storing data of vaporizable objects to be processed in this embodiment, programs of control procedures shown in FIGS. 1, 3, and 4, processing programs, persistent objects developed from the data base system 4, data required for processing, and programs of the X window. This memory can be constituted by a plurality of separate memories. Information stored in the memory includes those loaded from another memory. A computer bus 6 connects the input apparatus 1, the CPU 2, the output apparatus 3, the data base system 4, and the main memory 5 to each other and transmits data, addresses, and control information.

The flow of processing of this embodiment will be described below. This processing is roughly divided into two processing activities: reference to a vaporizable object, and updating of it.

The processing of referring to a vaporizable object will be described first.

When a persistent object A is to access reference to another persistent object B stored in the data base system 4, reference processing for the persistent object B is started.

In this embodiment, when the sketch tool as an application is making reference to composite graphic patterns that are shared by applications and contain characters and one of the composite graphic patterns is to be used, the reference processing is started. This processing has the following two features.

(1) When data stored in the data base system 4 is fetched into a predetermined storage area of the main memory 5, which is defined in the process of an application program, the initialization procedure for a vaporizable object is dynamically called. That is, when sketch data stored in the data base system 4 is to be fetched into a predetermined storage area of the main memory 5 and used as an object to be processed by the sketch tool, the vaporizable object initialization procedure stored in a predetermined area of the main memory 5 sets a vaporizable object consisting of a resource identifier, such as font information and color information, in the predetermined storage area of the main memory 5 defined by the above process.

(2) The vaporizable object located in the application process is directly pointed to by a process-local attribute that is contained in a persistent object copied to the main memory and has no influence on the data base.

In other words, the initialized resource identifier, such as font information and color information, that is, the vaporizable object, is distinguished from the persistent object by using the attribute which has no influence on the data base 4. This allows each persistent object to make reference to a vaporizable object in the same fashion as reference in the process, during execution of a plurality of sketch tools.

The above processing will be described below with reference to FIG. 1.

(a) Vaporizable object initialization processing

In this embodiment, the vaporizable object initialization processing is performed in the course of sketch data reference processing.

In step S101, the CPU 2 fetches sketch data stored in the data base system 4 into a storage area defined by the sketch tool and checks from schema information of the sketch data whether the data contains a vaporizable pointer. In this embodiment, a vaporizable pointer is used to point to font information and color information added to the sketch data. If the sketch data does not contain any vaporizable pointer in step S101, the CPU 2 immediately terminates the processing; if the data contains a vaporizable pointer in step S101, the flow advances to step S102, and the CPU 2 fetches an initialization factor 101 defined in the data base system 4 to create a vaporizable object. In this embodiment, the initialization factor 101 consists of a font name list for font information and numerical expression of the illuminance of each of RGB for color information.

In step S103, the CPU 2 initializes a vaporizable object 102 on the basis of the fetched initialization factor 101. In this embodiment, this initialization processing is to obtain a resource identifier for each of font information and color information by communicating with a window server using the library of the X window system, that is present in the main memory 5.

In step S104, to store the initialized vaporizable object 102 into a predetermined area of the main memory 5, the CPU 2 substitutes the pointer for the vaporizable object 102 into the process-local attribute in this sketch data.

The persistent object containing this process-local attribute is shared by a plurality of processes in the data base system 4. The process-local attribute, however, has no influence on the data base system 4 and can therefore have a value inherent in each individual application process.

In this embodiment, the processing of creating a new vaporizable object has been described. Instead, an object meeting desired conditions may be searched from the existing objects in processes and shared by the processes.

Figure 8:
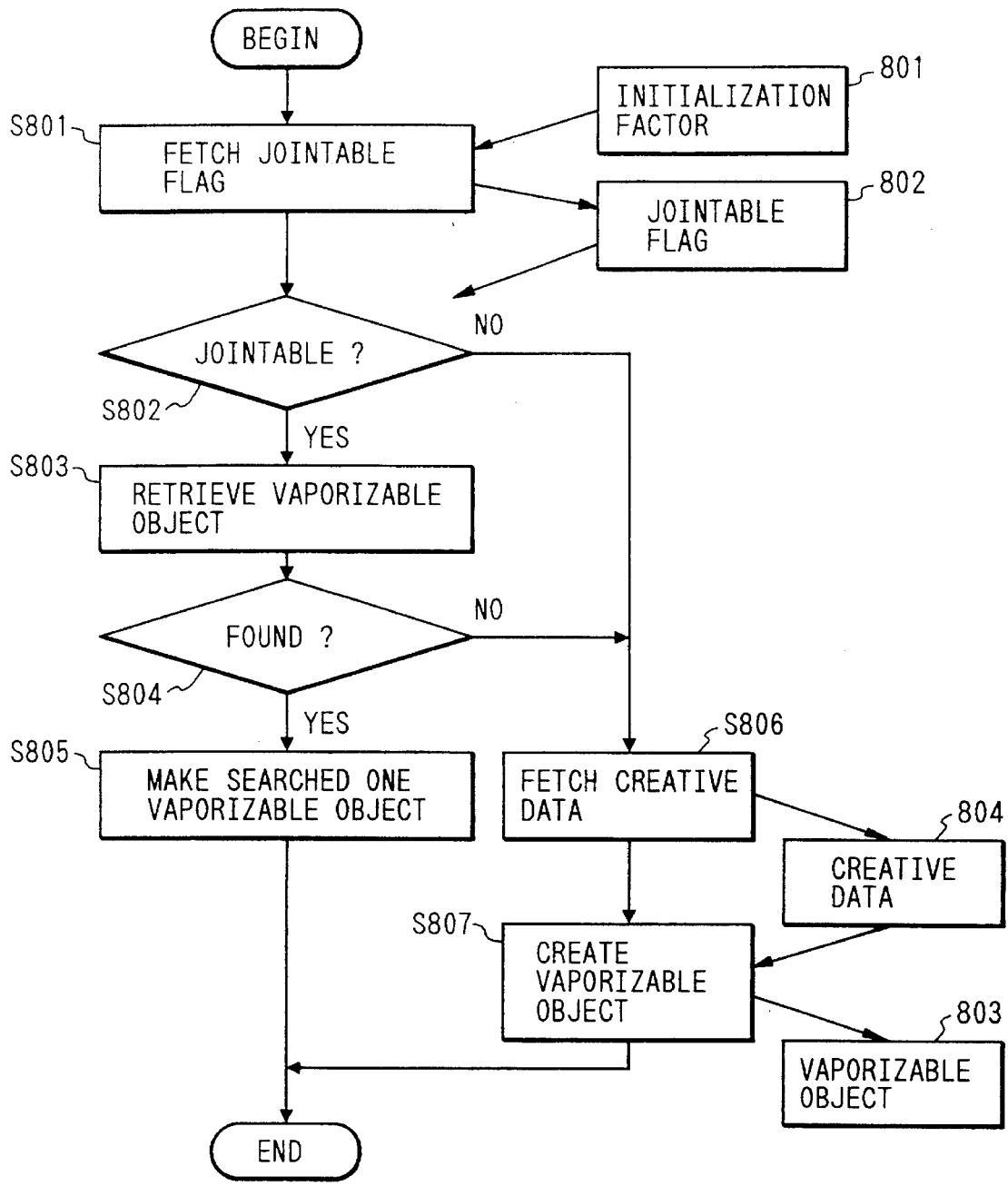
FIG. 8 is a flow chart showing initialization processing in detail.

The initialization processing executed for the vaporizable object 102 in step S103 of the above reference processing will be described below with reference to FIG. 8.

In step S801, the CPU 2 fetches a jointable flag 802 of a vaporizable object from an initialization factor 801.

In step S802, the CPU 2 checks jointability on the basis of the jointable flag 802.

If the jointable flag 802 indicates "jointable" in step S802, the CPU 2 retrieves a vaporizable object having the same value as the initialization factor 801 from vaporizable objects of this application in step S803.

In step S804, the CPU 2 checks whether a corresponding vaporizable object is found. If the corresponding vaporizable object is found in step S804, the flow advances to step S805, and the CPU 2 makes the searched one a vaporizable object 803 and ends the processing.

If the jointable flag 802 indicates "unjointable" in step S802 or no vaporizable object is found in step S804, the flow advances to step S806 to create a vaporizable object.

In step S806, the CPU 2 fetches creative data 804 required to create a vaporizable object from the initialization factor.

In step S807, the CPU 2 transfers the creative data 804 to a vaporizable object creating procedure, and creates a vaporizable object 803.

(b) Vaporizable object identification processing

A persistent object directly points to a vaporizable object by using a process-local attribute. Therefore, no special processing is required to identify a vaporizable object.

When a persistent object is to refer to a vaporizable object, therefore, processing can be performed in exactly the same way as the reference processing in an application process.

Vaporizable object updating processing will be described below with reference to FIG. 3.

(c) Updating processing

The processing of updating a sketch object containing a vaporizable object is divided into two processing activities: updating processing in the sketch tool, and updating processing for shared sketch data in the data base. The procedures of these two processing activities will be described below.

(S301) The sketch tool updates the attribute value of sketch data fetched into the process.

(S302) The CPU 2 checks by using schema information of the object whether the attribute of the sketch data is a process-local attribute.

(S303) If the attribute is a process-local attribute in step S302, the CPU 2 immediately terminates the processing.

(S304) If not, the CPU 2 informs the data base management system of this change and designates updating processing for the initialization factor of a value in the data base system 4.

If a vaporizable object is to be changed in the data base system 4, the following special processing must be performed. This processing will be described with reference to FIG. 4.

(S401) The CPU 2 obtains an initialization factor 402 concerning the value of a new vaporizable object 401.

In this embodiment, the initialization factor includes a font name list for font information and numerical expression of the illuminance of each of RGB for color information.

(S402) The CPU 2 registers the initialization factor 402 to the data base system 4.

(S403) In each of application processes which share a persistent object including this vaporizable object, the CPU 2 reinitializes each vaporizable object on the basis of the new initialization factor 402, holding the object in the process-local attribute.

The processing of this embodiment has been described.

In this embodiment, the procedure of dynamically reinitializing vaporizable objects has been described. However, it is also possible to initialize all vaporizable objects before the processing by checking them in advance, thereby reducing the load on initialization during execution of the processing.

In addition, centralized management can be easily performed for initialization factors by performing initialization activities simultaneously.

The second embodiment of the present invention will be described below with reference to the accompanying drawings.

The second embodiment exemplifies a system in which an original scene (corresponding to a vaporizable object; this scene will be referred to as a vaporizable scene hereinafter) of a user is fetched into a portion of a scene (corresponding to a persistent object; this scene will be referred to as a persistent scene hereinafter) of a video library such as film stock service shared by a plurality of users.

Figure 5:
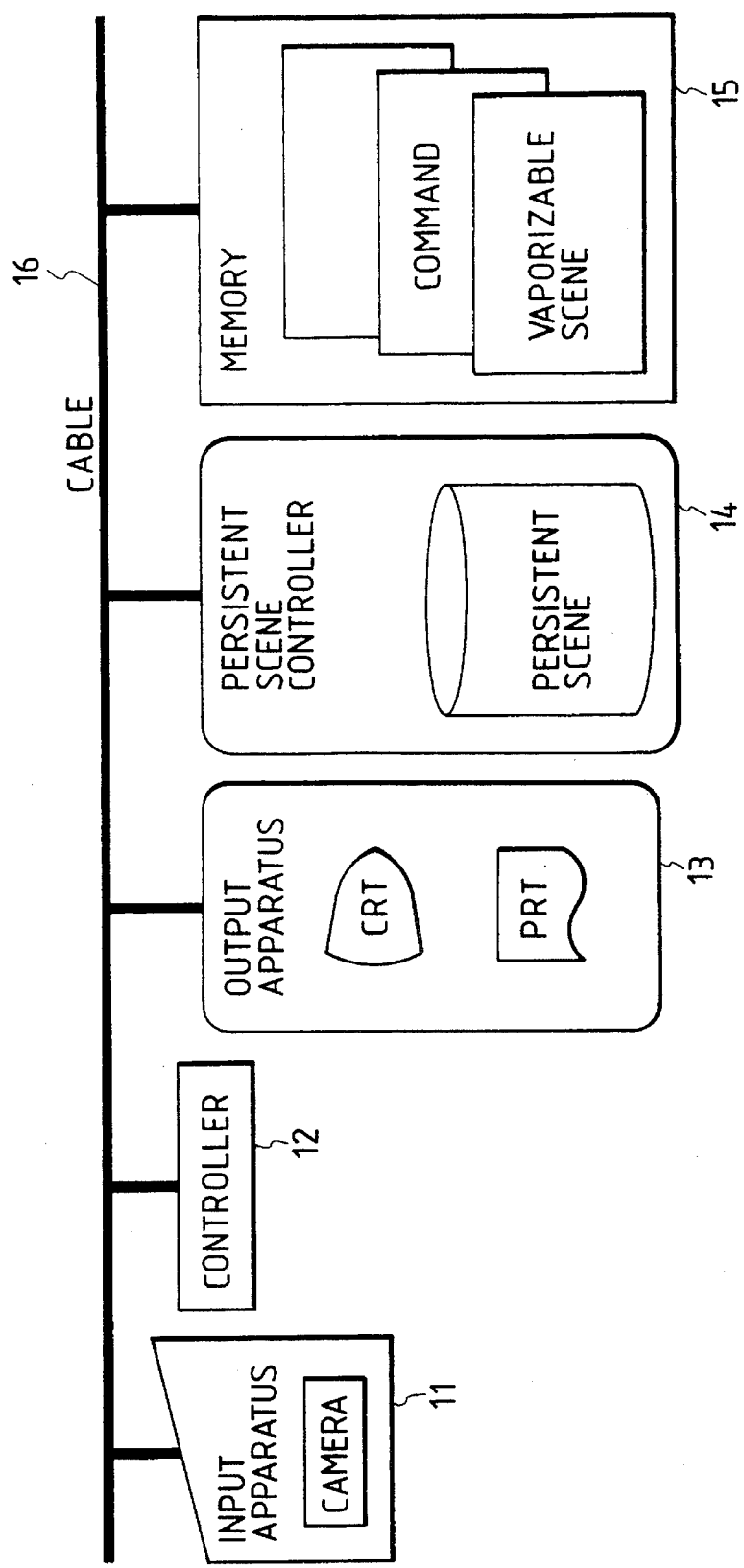
FIG. 5 is a block diagram showing the arrangement of a system according to the second embodiment of the present invention.

FIG. 5 is a block diagram showing the arrangement of the system according to this embodiment. Referring to FIG. 5, an input apparatus 11 is, e.g., a keyboard or a switch panel through which a user of the video library enters commands. If necessary, the input apparatus 11 includes a camera for acquiring vaporizable scenes to be stored in a memory 15.

A controller 12 performs the processing of this embodiment by executing control procedures stored in the memory 15 (to be described later) on the basis of commands entered from the input apparatus 11.

An output apparatus 13 is, e.g., a printer or a CRT display for printing out or displaying messages from the video library or processed video data.

A persistent scene controller 14 is, e.g., a laser disc player or a video player for driving recording media which store both persistent scenes and initialization factors.

Figure 6:
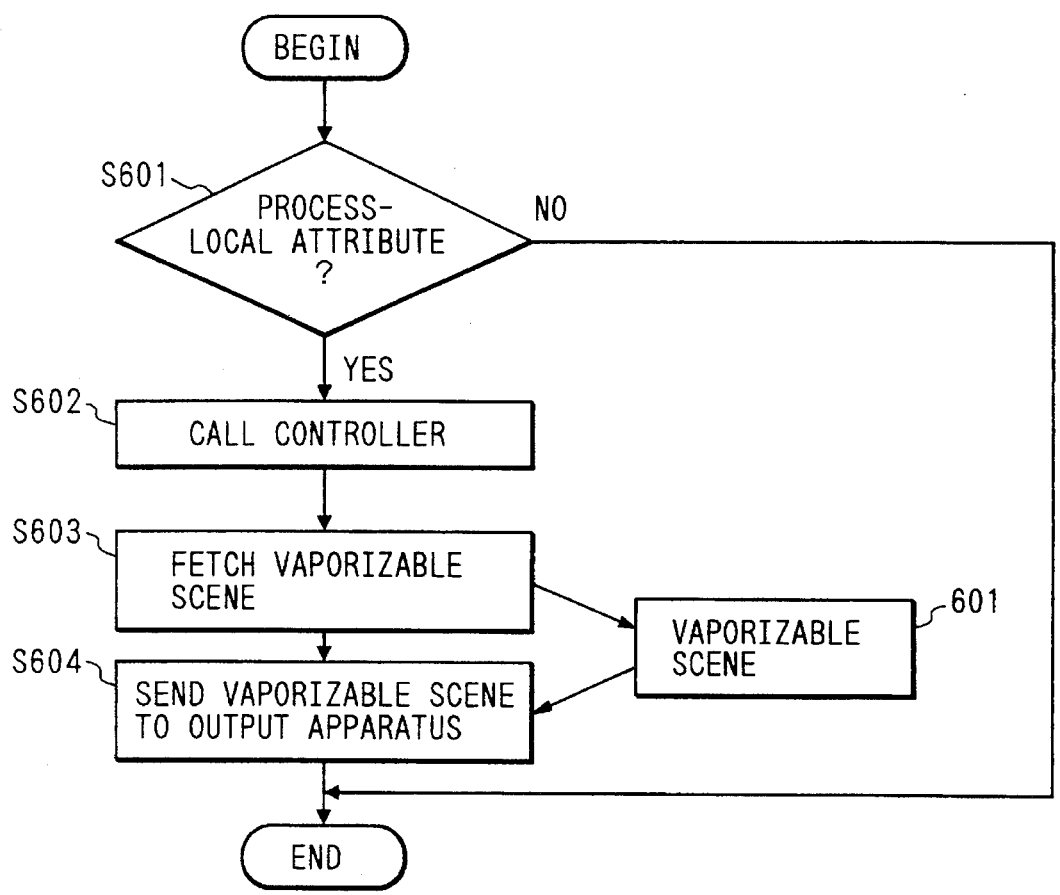
FIG. 6 is a flow chart showing processing of referring to an object containing a vaporizable object according to the second embodiment.

The memory 15 temporarily stores vaporizable scenes to be processed in this embodiment, a program of a control procedure shown in FIG. 6, and commands to the controller 12. The data stored in the memory 15 may be divisionally stored in separate memories.

A video cable 16 is a bus for connecting the above constituent elements to each other.

The flow of video scene reproduction processing according to this second embodiment will be described with reference to FIG. 6.

This embodiment also uses the process-local attribute explained in the above first embodiment in order to distinguish between a vaporizable scene and a persistent scene shared by users.

This process-local attribute is effective in the reproduction processing being executed and has no influence on persistent scenes shared by users.

The use of the process-local attribute makes it possible to easily describe the relationship between a persistent scene and a vaporizable scene without making any change in the persistent scene.

(S601) While a persistent scene shared by users is being reproduced, whether a process-local attribute for pointing to a vaporizable scene is embedded in the persistent scene is checked.

(S602) If it is determined in step S601 that a process-local attribute is embedded, the controller 12 is called to fetch a vaporizable scene 601 that a vaporizable pointer corresponding to the process-local attribute points to.

(S603) The controller 12 dynamically fetches a local vaporizable scene 601 of this reproduction processing from the input apparatus as needed. Alternatively, the controller 12 synthesizes a vaporizable scene from the existing persistent scene or the vaporizable scene 601.

(S604) The controller 12 sends the fetched vaporizable scene 601 to the output apparatus 13 and replaces the vaporizable pointer of the persistent scene with this vaporizable scene 601.

It is also possible to read vaporizable pointers in advance in order to display video scenes in real time.

In this embodiment, a vaporizable pointer, i.e., a vaporizable scene, is dynamically initialized and fetched during reproduction of a persistent scene. However, vaporizable scenes can also be initialized beforehand so that only reference to the vaporizable scenes need be performed during reproduction of persistent scenes, thereby improving the real-time performance of video scene reproduction. In this embodiment, management of video information has been described by taking a video library as an example. However, the embodiment can also be applied to a general application in which video information needs to be shared by a plurality of users and a plurality of applications.

In addition, this embodiment is readily applicable to management of multimedia information required to be shared as well as video information.

The third embodiment of the present invention will be described below with reference to FIGS. 2 and 9.

This embodiment, like the first embodiment, exemplifies a system in which data base management is performed for sketch information in a sketch tool application of an X window system. The arrangement of the system is the same as that of the first embodiment shown in FIG. 2.

Figure 9:
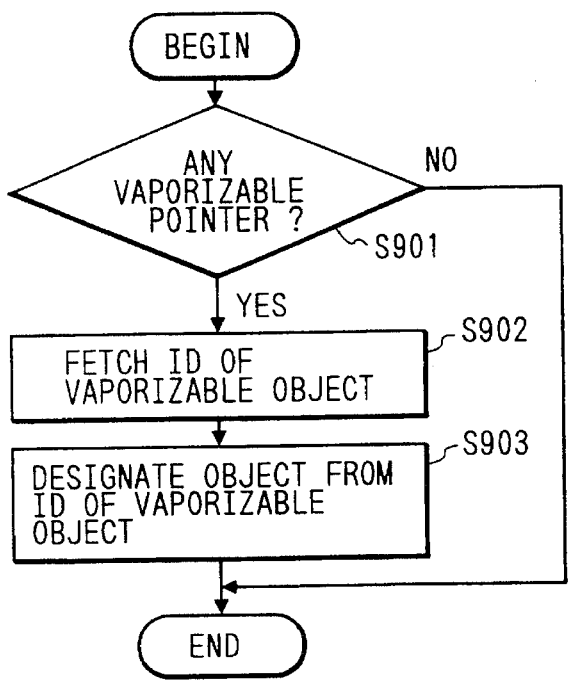
FIG. 9 is a flow chart showing processing of referring to an object containing a vaporizable object according to the third embodiment.

FIG. 9 is a flow chart showing processing of referring to an object containing a vaporizable pointer of this embodiment.

The flow of processing of this embodiment will be described below. The processing is roughly divided into two processing activities: processing of referring to a vaporizable object, and processing of updating it.

The vaporizable object reference processing will be described first with reference to FIG. 9.

In step S901, a CPU 2 checks whether sketch data in a data base contains a vaporizable pointer.

In this embodiment, a vaporizable pointer is used to point to font information and color information added to the sketch data. If it is determined in step S901 that no vaporizable pointer is contained, the CPU 2 immediately terminates the processing.

If it is determined in step S901 that a vaporizable pointer is contained, the flow advances to step S902, and the CPU 2 fetches the identifier of a vaporizable object pointed to by the vaporizable pointer.

In this embodiment, the identifier consists of a name on a font name list for font information and numerical expression of the illuminance of each of RGB for color information.

In step S903, the CPU 2 designates a vaporizable object from the identifier fetched.

A pointer corresponding to the vaporizable object designated in step S903 is the result of this reference processing. Since each individual process has its own vaporizable pointer, the reference result can have a value inherent in each process.

The vaporizable object updating processing will be described below. In updating a vaporizable object designated by a vaporizable pointer, no processing need be performed for persistent data if the identifier of the vaporizable object remains unchanged. When the identifier of the vaporizable object is changed, for example, when the value of the vaporizable pointer is changed, the identifier of a vaporizable object in the persistent data is updated.

The processing of this third embodiment has been described.

Figure 10:
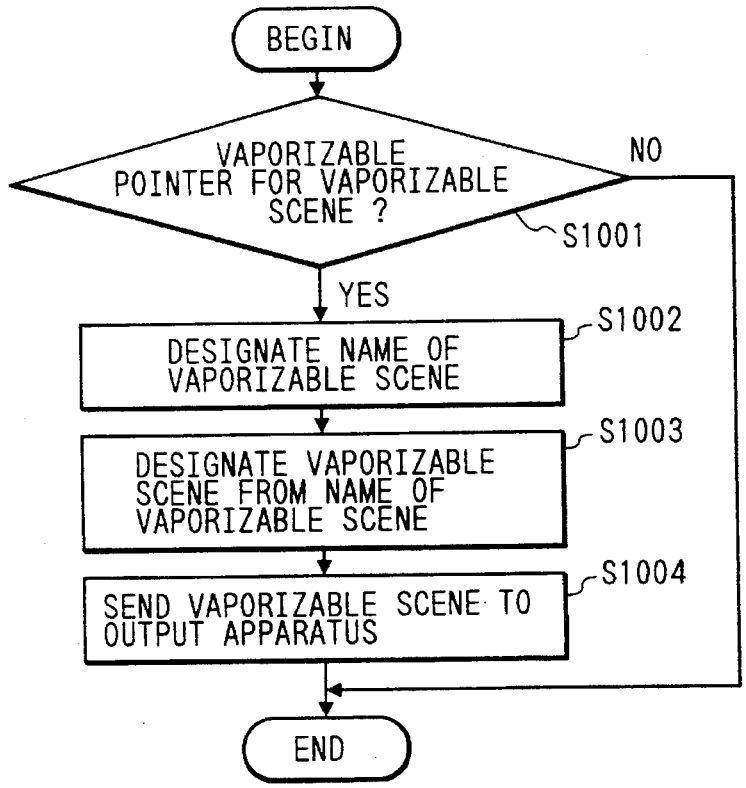
FIG. 10 is a flow chart showing processing of referring to an object containing a vaporizable object according to the fourth embodiment.

The fourth embodiment of the present invention will be described below with reference to FIGS. 5 and 10.

The fourth embodiment, like the second embodiment mentioned earlier, exemplifies a system in which an original vaporizable scene of a user is fetched into a portion of a persistent scene of a video library such as film stock service shared by a plurality of users. The arrangement of the system is the same as that of the second embodiment shown in FIG. 5.

The flow of video scene reproduction processing according to this fourth embodiment will be described with reference to FIG. 10.

In step S1001, while a persistent scene shared by users is being reproduced, a controller 12 checks whether the persistent scene has a vaporizable pointer for a vaporizable scene.

If the persistent scene has a vaporizable pointer for a vaporizable scene in step S1001, the flow advances to step S1002, and the controller 12 designates the identifier of the vaporizable scene.

In step S1003, the controller 12 designates the vaporizable scene in accordance with the identifier from input scenes from an input apparatus 11, existing persistent scenes in a persistent scene controller 14, and existing vaporizable scenes in a memory 15.

In step S1004, the controller 12 sends the designated vaporizable scene to an output apparatus 13, replacing the vaporizable pointer of the persistent scene with the vaporizable scene.

In this embodiment, vaporizable pointers may be read in advance in order to display video scenes in real time.

This embodiment illustrates the processing in which a vaporizable object, i.e., a vaporizable scene, is dynamically fetched during reproduction of a persistent scene. However, it is also possible to designate and prepare necessary vaporizable scenes before reproduction so that only reference to the vaporizable scenes need be performed during reproduction of persistent scenes, thereby improving the real-time performance of video scene reproduction.

In this fourth embodiment, management of video information has been described by taking a video library as an example. However, the embodiment is also applicable to a general application in which video information needs to be shared by a plurality of users and a plurality of applications.

In addition, this embodiment can be applied to management of multimedia information required to be shared as well as video information.

As has been described above, in an application process in which various data are shared by users, the present invention automates management of temporary data which disappears when the application process is finished. As a result, the present invention can provide the following advantages in situations where data are shared parallel to each other at the same time in an "application in which both persistent objects and vaporizable objects are entangled intricately", such as in a multimedia data base.

(1) Even if a persistent object contains a vaporizable object, no data is lost from the persistent object while the object is being used by an application process.

(2) The consistency of a persistent object shared by a plurality of application processes is maintained.

(3) The advantages of items (1) and (2) above can be obtained in the same manner as reference in a persistent object or reference in a vaporizable object, reducing the load on programmers.

The fifth embodiment of the present invention exemplifies data management for sketch information in a sketch application using a window system.

The arrangement of a system according to this embodiment is the same as that shown in FIG. 2.

FIG. 11 is a view showing the definitions of a circle among sketch primitives processed in the sketch application. Referring to FIG. 11, a class definition 111 describes the attribute and the behavior of a circle and consists of description from "begin" to "end". A class representing a circle will be referred to as Circle, and a given instance in Circle will be referred to as aCircle, hereinafter. A definition 112 describes the persistent instance attributes of Circle and is constituted by instances x-center, y-center, and radius of Dimension class representing the coordinates and the length, and reference color to the persistent instance of Color class representing color information. All of the persistent instance attributes of a persistent object are persistent objects. Note that although the reference to an instance of the class Color is represented by ^Color, color can also be regarded as an instance of ^Color class and hence will be so handled.

A definition 113 describes the vaporizable instance attributes of Circle and consists of instance pen of Pen class representing a sketch attribute and reference windows to WindowList representing windows in which aCircle is sketched. Similar to the persistent instance attributes 112, the vaporizable instance attributes give a data structure of class. However, the vaporizable instance attribute is a vaporizable object formed for each application referring to a persistent object containing the vaporizable instance attribute, whereas the persistent instance attribute is a persistent object formed for each individual instance.

A definition 114 describes the persistent class attributes of Circle. The class attribute has a value common to all instances, whereas the persistent or vaporizable instance attribute has a value inherent in each instance. In this embodiment, instance num-of-Circles of Integer class representing the number of all instances of Circle is defined.

A definition 115 describes the vaporizable class attributes of Circle. Similar to the vaporizable instance attribute, the vaporizable class attribute has a value common to instances belonging to a predetermined class in each application. In this embodiment, window-system as an instance of ^WindowSystem class representing reference to control information of the window system exists only while the application is operating and is a vaporizable object common to all instances of Circle class. A definition 116 represents declaration of instance methods of Circle, which defines a series of messages that aCircle accepts and the class of an instance representing a value sent back from the method itself, which is defined separately. If no value is sent back, this class is represented by Void. In this embodiment, the instance methods 116 include display method of displaying aCircle; set-x method of changing the X coordinate of aCircle into instance x of Dimension class and sending back reference to aCircle that has been changed; set-y, set-r, and set-c methods of changing the Y coordinate, the radius, and the color of aCircle, like the set-x method; changed method of informing the change in aCircle; and destroy method of destroying aCircle.

A definition 117 describes class methods of Circle. The class methods have no effect on a particular instance but are used in creation of instances or initialization of class attributes. In this embodiment, create methods are defined; after instances of Circle are created and their instance attributes are set in accordance with arguments $\underline{x}$, $\underline{y}$, $\underline{r}$, and $\underline{c}$, create methods send back references to the instances created.

Note that the definitions of persistent attributes and vaporizable attributes shown in FIG. 11 can be obtained by two types of methods: one is a method of designating instance variables as a group, as in this embodiment; the other is a method of designating each instance variable in a form in which it modifies a class, like "transient Dimension". These two methods are equivalent in meaning. This embodiment will be described in accordance with the definitions shown in FIG. 11.

Figure 12:
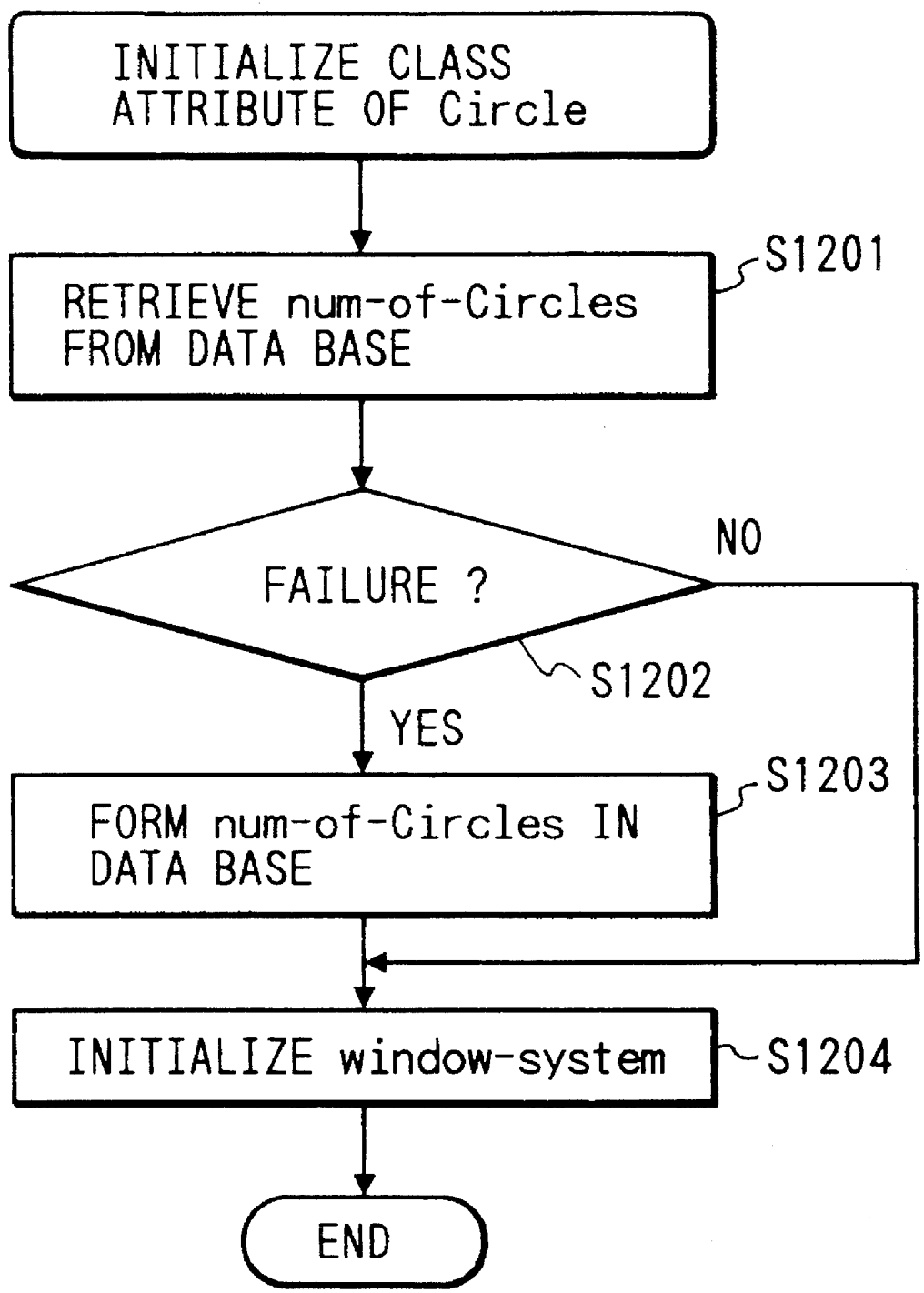
FIG. 12 is a flow chart showing processing of initializing the class attribute of a semi-persistent object.

FIG. 12 is a flow chart showing a procedure of initializing the class attributes of class Circle. The class attributes of class Circle include the persistent class attribute num-of-Circles and the vaporizable class attribute window-system. In step S1201, a CPU 2 retrieves the persistent class attribute num-of-Circles from a data base system 4. If failure of retrieval is determined in step S1202, the CPU 2 determines that class Circle has not been used from any application, and the flow advances to step S1203. In step S1203, the CPU 2 forms a persistent object num-of-Circles and initializes the value to 0. Subsequently, in step S1204, the CPU 2 initializes the vaporizable class attribute window-system by referring to window-system control information obtained as the result of initialization of the window system according to a known method. The above processing is performed once when an application uses class Circle for the first time.

Figure 13:
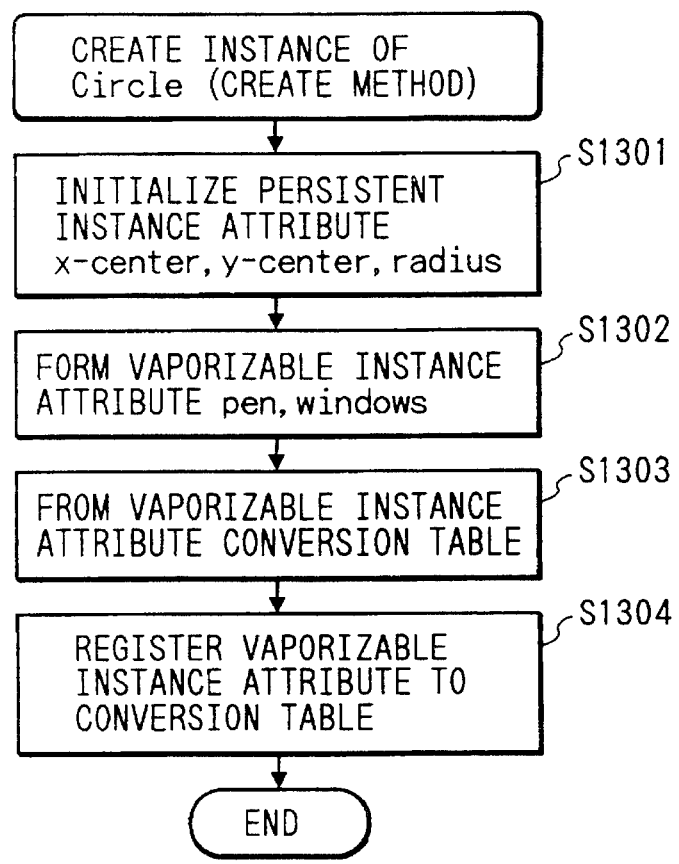
FIG. 13 is a flow chart showing a procedure of creating the instance of a semi-persistent object.

FIG. 13 is a flow chart showing a procedure of creating instance aCircle of class Circle, which is executed by the CPU 2 of a processor. As described above, instances of class Circle are created by the create method. First, after ensuring a storage area for aCircle in the data base, the CPU 2 initializes the persistent instance attributes x-center, y-center, and radius by using the arguments (step S1301). Subsequently, the CPU 2 forms vaporizable objects pen and windows representing the vaporizable instance attributes (step S1302). In this embodiment, these vaporizable objects are formed in a virtual space of the application. However, the vaporizable objects can also be formed in the data base. Following the above processing, the CPU 2 forms a vaporizable instance attribute conversion table to be described later with reference to FIGS. 14 to 16 (step S1303), registers the vaporizable objects to the instance attribute conversion table (step S1304), and ends the processing.

Figure 14:
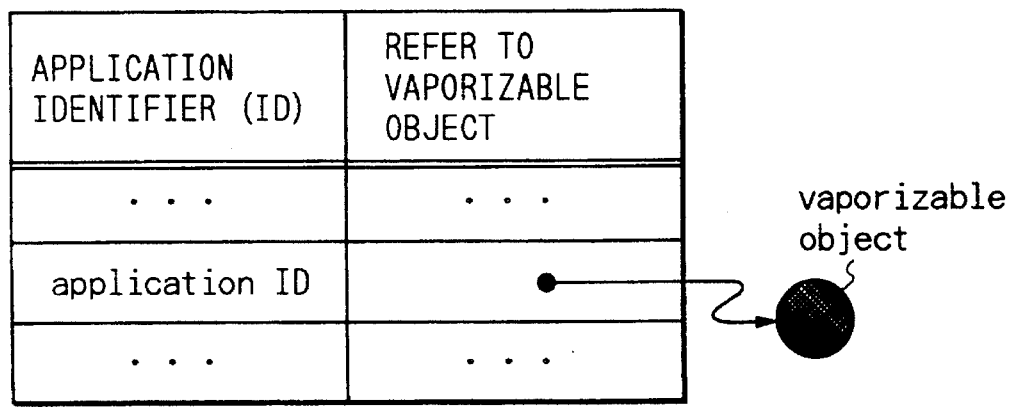
FIG. 14 is a view showing a conversion table of the vaporizable instance attributes of semi-persistent objects, formed for each instance in a data base.
Figure 15:
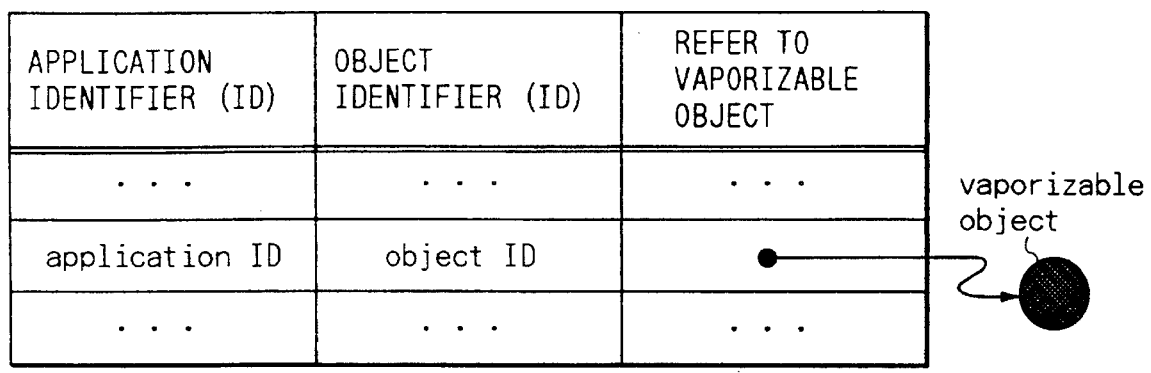
FIG. 15 is a view showing a conversion table of the vaporizable instance attributes of semi-persistent objects, formed for each class or globally in a data base.
Figure 16:
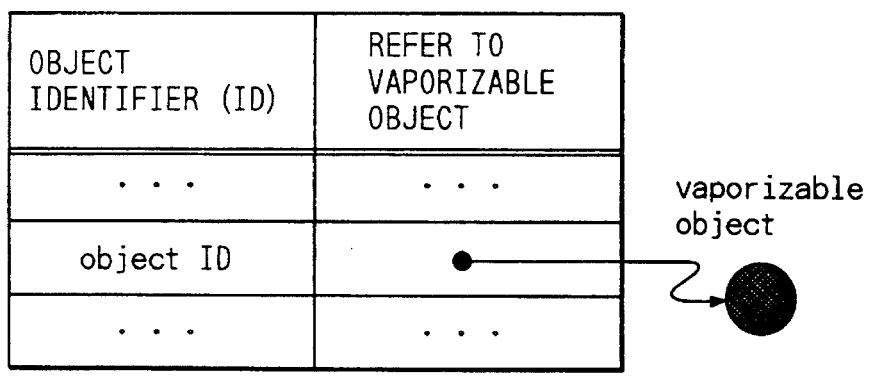
FIG. 16 is a view showing a conversion table of the vaporizable instance attributes of semi-persistent objects, formed for each class or globally in a virtual space of an application.

FIGS. 14 to 16 are views each showing the vaporizable instance attribute conversion table described above.

Methods of forming the conversion table are classified into three types: a method of forming a table for each instance, a method of forming a table for each class, and a method of forming a single global table. The two latter types are further classified into a method of placing the conversion table in the data base 4 and a method of placing the conversion table in a virtual space of an application in a storage area of the main memory 5. Each method will be explained below.

FIG. 14 is a view showing the method of forming a conversion table for each instance in the data base.

The conversion table is constituted as a dictionary having an application identifier as a key and reference to a vaporizable object as a value. The application identifier is provided by an operating system and is, e.g., a set of a host identifier and a process identifier.

FIG. 15 is a view showing the method of forming a conversion table for each class or a global conversion table in the data base. The conversion table is constituted as a dictionary having an application identifier and an object identifier as keys and reference to a vaporizable object as a value. The application identifier is identical to that of FIG. 14. The object identifier is assigned as a number not recurring in the same class, in the conversion table for each class, and as a number not recurring in the data base, in the global conversion table, for each vaporizable instance attribute represented as a vaporizable object. Since an application generally uses a plurality of instances of a given class, a plurality of vaporizable instance attributes are generally present in the same class. Therefore, the object identifier is necessary to distinguish between these attributes. Note that the object identifier may be either an identifier given by the data base system or a number or the like obtained independently of the data base system, e.g., a number obtained by a number generating mechanism for generating a number in accordance with a known method each time it is requested.

FIG. 16 is a view showing the method of forming the conversion table for each class or the global conversion table in a virtual space of an application. This conversion table is constituted as a dictionary having an object identifier as a key and reference to a vaporizable object as a value. Since the conversion table itself is information inherent in an application, no identification of an application need be performed in the data base. This makes the use of an application identifier unnecessary unlike the table shown in FIG. 15. When no application identifier is used, on the contrary, whether information about reference to the same object from another application can be obtained depends on a data base system being used. If the data base system does not provide the reference information, a conversion table is formed by omitting the column of reference to vaporizable object from the conversion table shown in FIG. 15. This can provide an equivalent function.

Figure 17:
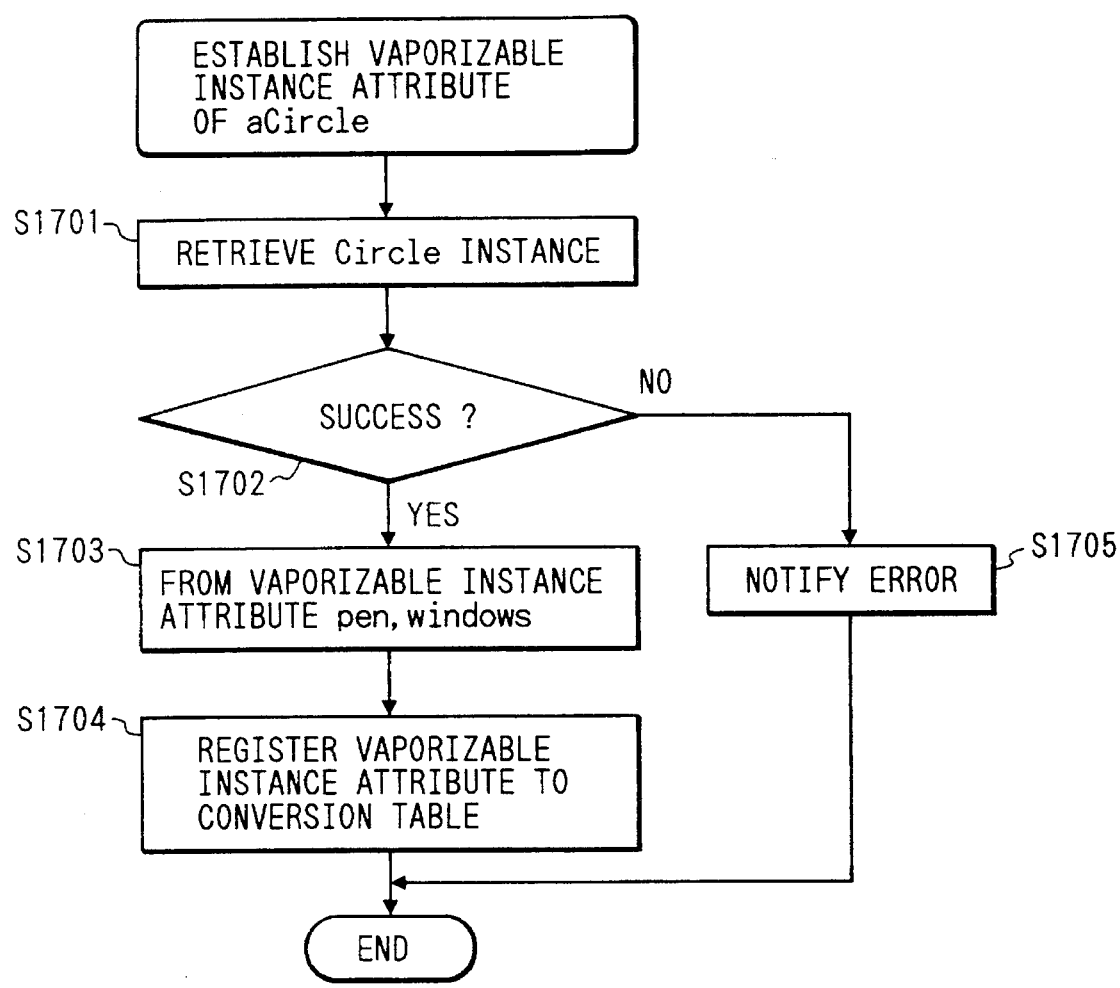
FIG. 17 is a flow chart showing a procedure of setting the vaporizable instance attribute of a semi-persistent object.

FIG. 17 is a flow chart showing a procedure in which an application retrieves aCircle already formed to establish vaporizable instance attributes inherent in the application. This procedure is executed by the CPU of a processor. First, the CPU retrieves Circle object stored in the data base (step S1701). The CPU then checks whether the retrieval is successful (step S1702). If success is determined in step S1702, the CPU forms vaporizable instance attributes (step S1703) and registers the vaporizable instance attributes formed to a conversion table (step S1704). If success is not determined in step S1702, the CPU notifies the error (step S1705) and ends the processing.

Figure 18:
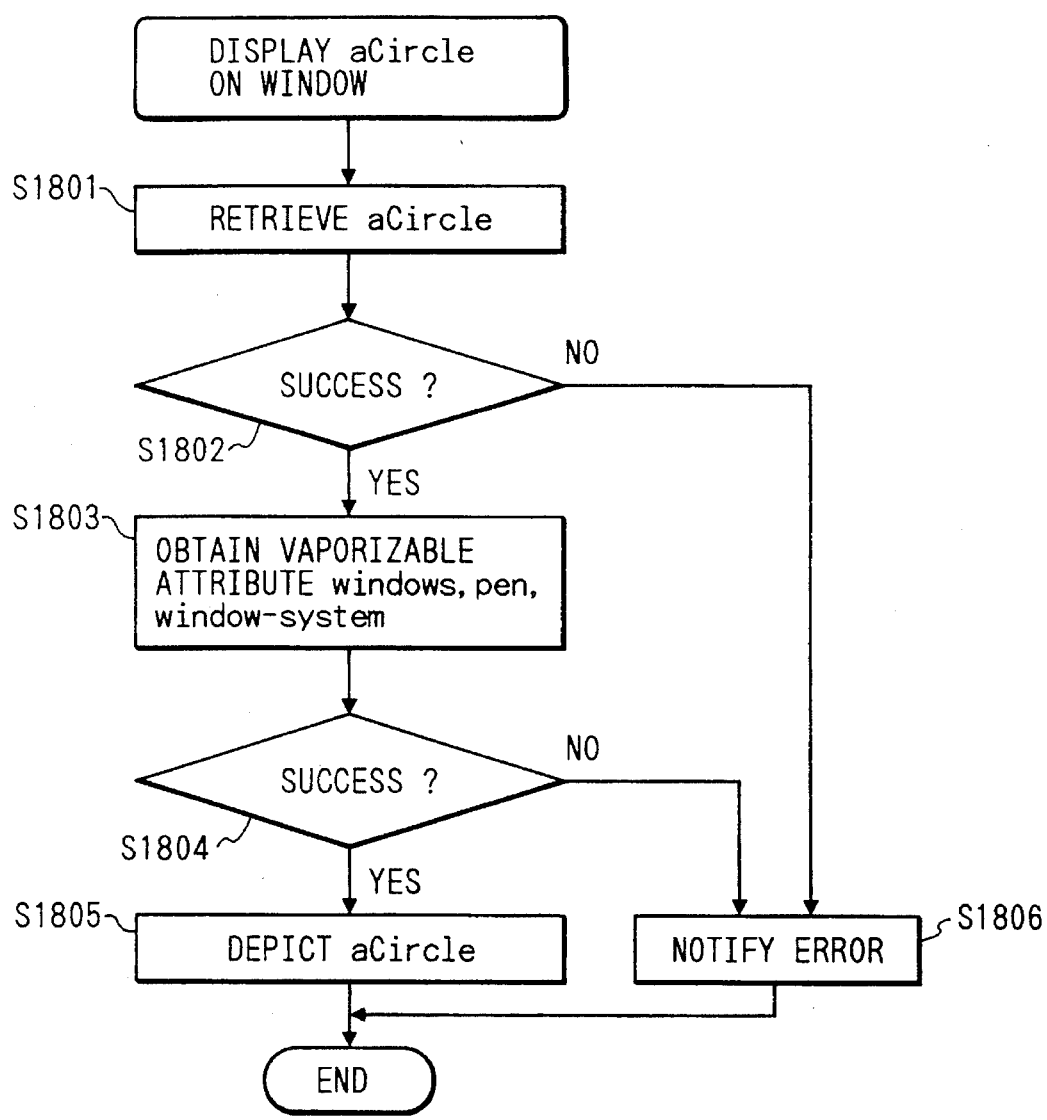
FIG. 18 is a flow chart showing a procedure of performing processing using the vaporizable attribute of a semi-persistent object.

FIG. 18 is a flow chart showing a procedure of displaying aCircle in a window. First, the CPU retrieves instance aCircle (step S1801). If success of the retrieval is determined, the CPU obtains vaporizable attributes windows, pen, and window-system (steps S1802 and S1803). The details of this processing will be described later with reference to FIG. 19. If success of the obtaining is determined, the CPU depicts aCircle by using the obtained vaporizable attributes (steps S1804 and S1805). In the above processing, if some error occurs in step S1802 or S1804, the CPU notifies the error and ends the processing (step S1806).

Figure 19:
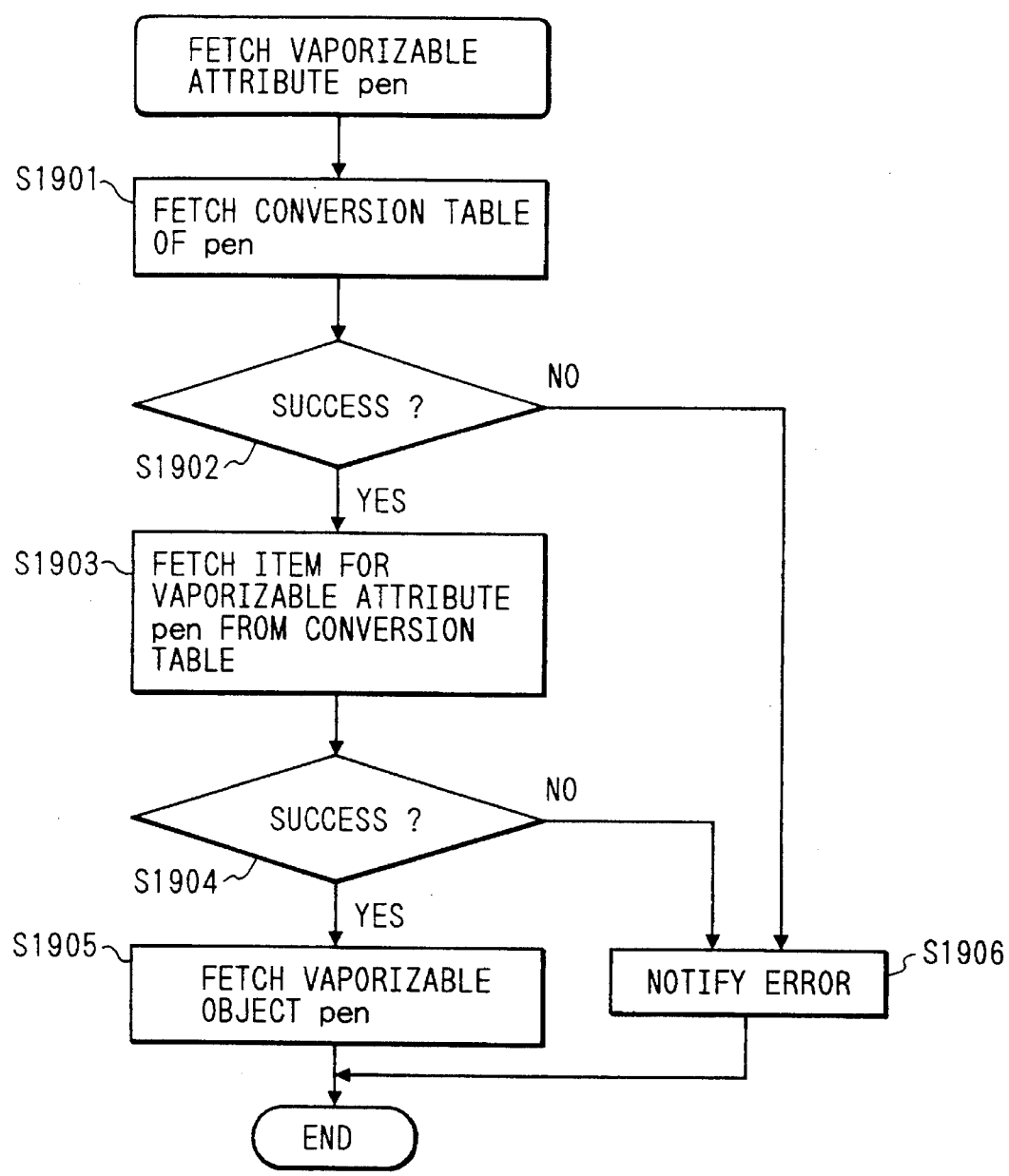
FIG. 19 is a flow chart showing a procedure of fetching the vaporizable attribute of a semi-persistent object.

FIG. 19 is a flow chart showing the procedure of fetching vaporizable attributes executed in step S1803 of FIG. 18. In this case, a vaporizable class attribute is realized as a global variable used in known programming languages and is so handled in the present invention. A vaporizable instance attribute, on the other hand, is registered and referred to by using any of the conversion tables shown in FIGS. 14 to 16. In the following description, a procedure of fetching the vaporizable instance attribute pen by using the conversion table shown in FIG. 14 will be explained.

Referring to FIG. 19, the CPU fetches the conversion table to which the vaporizable attribute pen is registered (step S1901). This fetching is performed by using a known data base retrieving method if the conversion table is of the type placed in the data base shown in FIG. 14 or 15, and is performed directly from a memory space of an application if the conversion table is of the type placed in a virtual space of an application shown in FIG. 16. If success of the fetching of this conversion table is determined, the CPU fetches an item for the vaporizable attribute pen from the conversion table (steps S1902 and S1903). If success of this fetching of the item is determined, the CPU fetches vaporizable object pen from the item (steps S1904 and S1905). If some error occurs in step S1902 or S1904 of the above processing, the CPU notifies the error (step S1906) and ends the processing.

Figure 20:
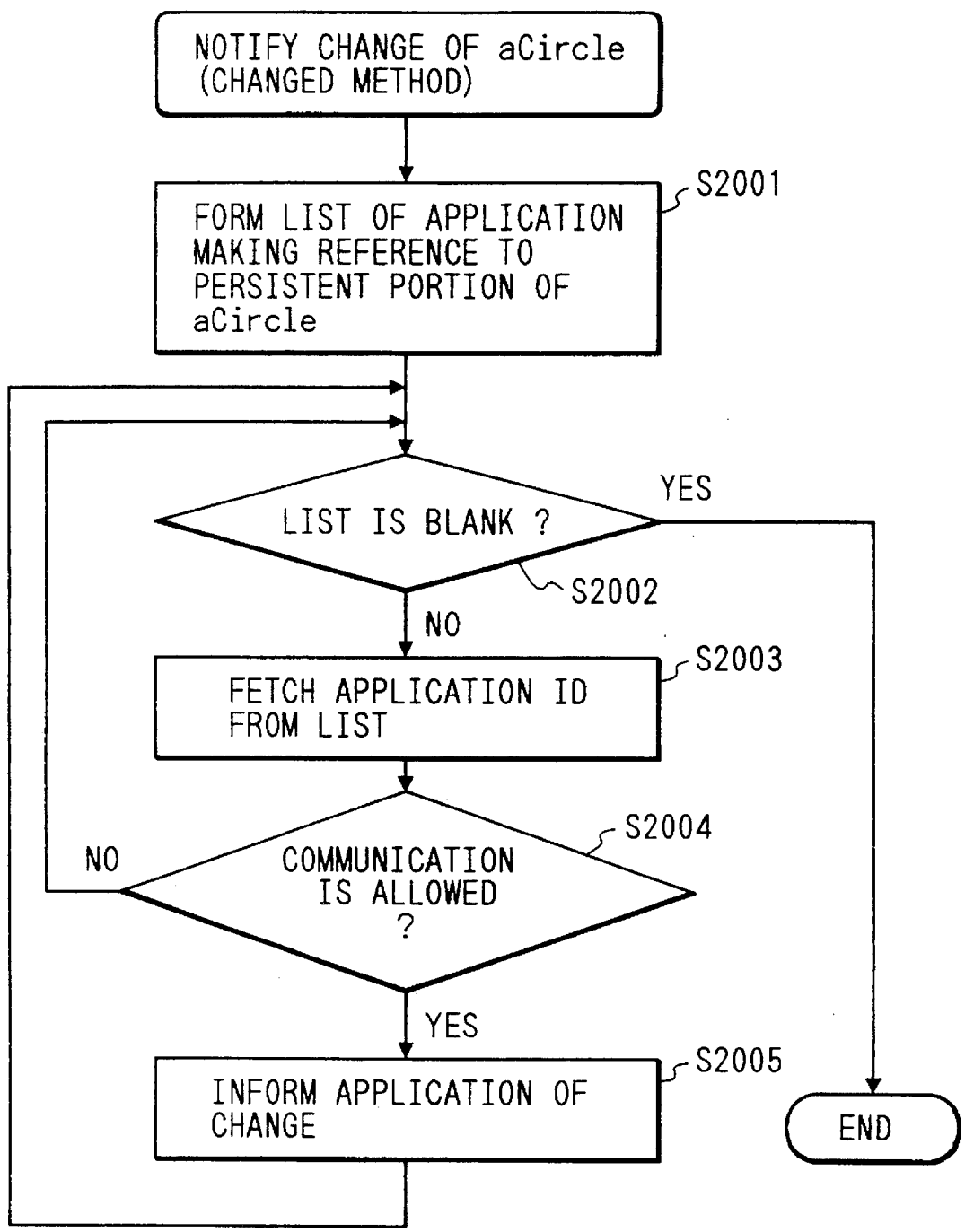
FIG. 20 is a flow chart showing a procedure of informing an application making reference to a semi-persistent object of a change in the semi-persistent object.

FIG. 20 is a flow chart showing a procedure in which when an object (to be referred to as a semi-persistent object hereinafter) having both a persistent portion and a vaporizable portion is changed, applications sharing the persistent portion of the semi-persistent object are informed of this change in the persistent portion. As described above, notification of change in aCircle is performed by changed method. First, the CPU forms a list of application identifiers making reference to the persistent portion of the semi-persistent object aCircle (step S2001). This list can be formed from the conversion table shown in FIG. 14 or 15. If it is possible to form the list by using the function of the data base system, the list may be so formed. Subsequently, the CPU checks whether the list formed in step S2001 is blank (step S2002). If the list is blank in step S2002, the CPU determines that no other application makes reference to aCircle and therefore immediately terminates the processing. If the list is not blank in step S2002, the CPU fetches an application identifier from the list (step S2003). In addition, the CPU checks by using a known process-to-process communication function provided by an operating system or the like whether communication to an application corresponding to the application identifier fetched is allowed (step S2004). If the communication is allowed in step S2004, the CPU informs the application of the change (step S2005). After repeatedly executing the above processing until the list becomes blank, the CPU ends the processing. Note that the application which has received the information of change redisplays aCircle in accordance with, e.g., the procedure shown in FIG. 18.

Figure 21:
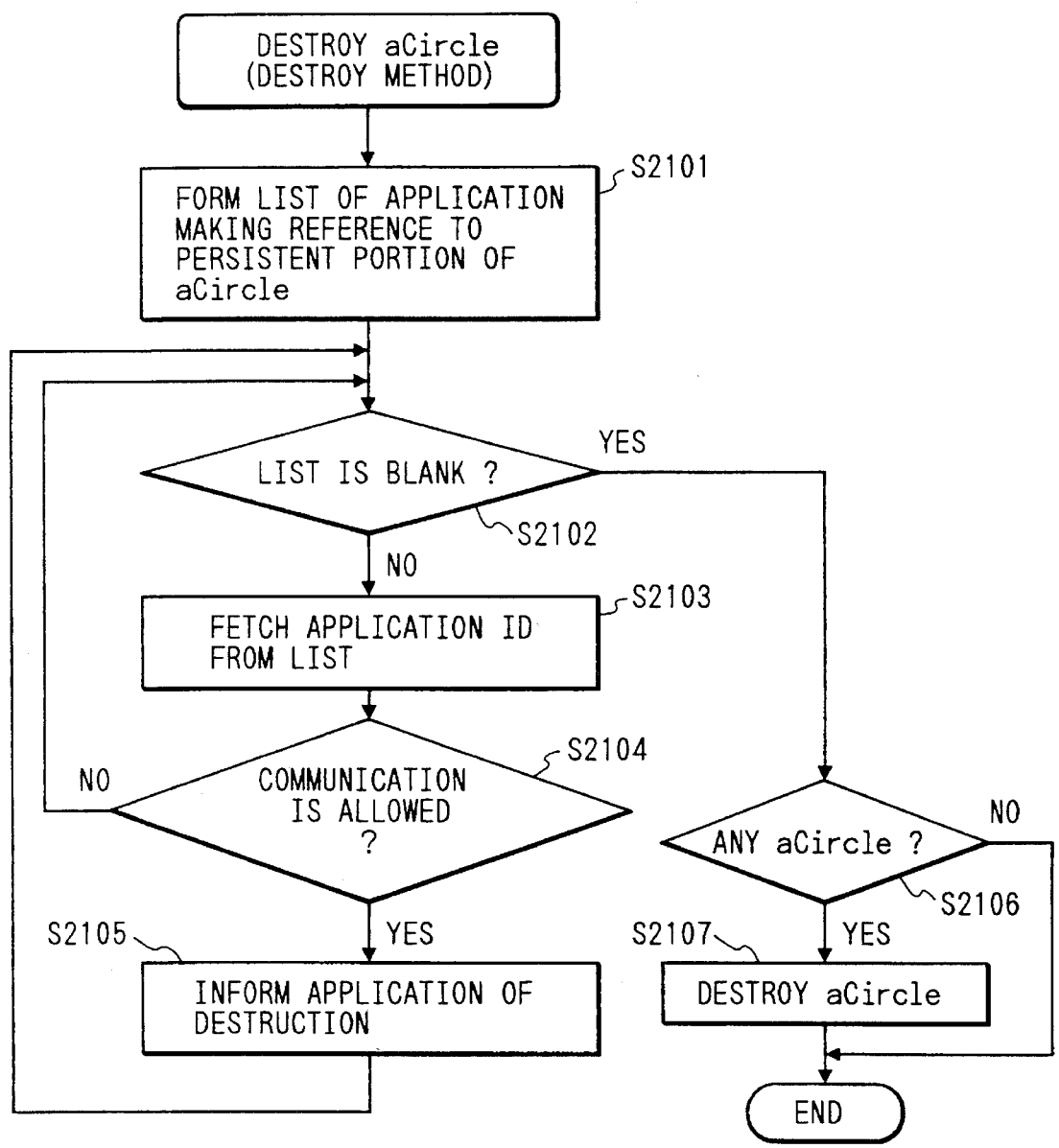
FIG. 21 is a flow chart showing a procedure of informing an application making reference to a semi-persistent object of destruction of the semi-persistent object before the destruction.

FIG. 21 is a flow chart showing a procedure in which when a semi-persistent object is to be destroyed, applications sharing a persistent portion of the semi-persistent object are informed of this destruction. Two types of informing methods of destruction are possible: one is informing after destruction, and the other is informing before destruction. The former informing method is performed in accordance with the procedure shown in FIG. 20. In the latter informing method, on the other hand, processing similar to that shown in FIG. 20 is executed before destruction (steps S2101 to S2105). The CPU then checks whether an object of interest is destroyed beforehand by another application and already erased from the data base during execution of informing destruction (step S2106). If the object is not destroyed yet and present in the data base, the CPU destroys the object (step S2107) and ends the processing. Note that in informing destruction between applications, a given application which has received the information may issue change information according to the method shown in FIG. 20 so that the processing in FIG. 20 is performed in association with the processing shown in FIG. 21. This makes it possible to perform the destruction processing cooperatively between a plurality of applications. This combination with the processing shown in FIG. 20 can realize any given cooperative processing as well as the destruction processing.

As has been described above, the present invention realizes a data structure containing both persistent data shared by a plurality of applications and vaporizable data each inherent in a particular application, and provides a function of informing applications of change or destruction of the data structure. Consequently, the present invention can provide the following advantages when data are shared parallel to each other at the same time in an application in which persistent objects and vaporizable objects are processed in a complicated relationship to each other, as in a multimedia data base.

(1) Even if a persistent object contains a vaporizable object, no data is lost from the persistent object while the object is being used by an application.

(2) The consistency of a persistent object shared by a plurality of applications is maintained.

(3) A cooperative operation between a plurality of applications can be easily realized.

Although the present invention has been described in its preferred form with a certain degree of particularly, many apparently widely different embodiments of the invention can be made without departing from the spirit and the scope thereof. It is to be understood that the invention is not limited to the specific embodiments thereof except as defined in the appended claims.

What is claimed is:

1. A data management method of managing shared data which is shared by a plurality of processes and data inherent in a process which exists during execution of one particular process and disappears when the process is finished, comprising the steps of:

checking, when each process fetches shared data from a data base into a memory, whether the shared data requires data inherent in the process;

determining the inherent data of the process if necessity for the data is determined;

storing the determined inherent data of the process in the memory; and storing a pointer for the inherent data of the process, which is stored in the memory, into the fetched shared data in accordance with attributes inherent in the process requiring the inherent data of the process.

2. A method according to claim 1, wherein the determined inherent data of the process is newly created, and the created inherent data of the process is stored in the memory.

3. A method according to claim 1, wherein the determined inherent data of the process is searched from existing data in the memory, and, if corresponding data is present, the corresponding data is stored in the memory and shared.

4. A method according to claim 1, wherein the shared data is graphic information, and the data inherent in the process is a resource identifier of color information for sketching the graphic information.

5. A method according to claim 1, wherein the shared data is character information, and the data inherent in the process is a resource identifier of font information for obtaining a visible output of the character information.

6. A method according to claim 1, wherein the shared data is first dynamic image information, and the data inherent in the process is second dynamic image information to be inserted at a certain point into the first dynamic image information.

7. A data management method of managing shared data which is shared by a plurality of processes and data inherent in a process which exists during execution of one particular process and disappears when the process is finished, comprising the steps of:

storing data inherent in each process, which the process requires in relation to shared data in a data base, into a memory;

storing an identifier of the inherent data of each process in the shared data in accordance with attributes inherent in the process;

reading out, when each process makes reference to the shared data in the data base, the identifier stored in the shared data in accordance with the inherent attributes of the process; and designating necessary data inherent in the process in the memory in accordance with the readout identifier.

8. A method according to claim 7, wherein the shared data is graphic information, and the data inherent in the process is a resource identifier of color information for sketching the graphic information.

9. A method according to claim 7, wherein the shared data is character information, and the data inherent in the process is a resource identifier of font information for obtaining a visible output of the character information.

10. A method according to claim 7, wherein the shared data is first dynamic image information, and the data inherent in the process is second dynamic image information to be inserted at a certain point into the first dynamic image information.

11. A data management method of managing shared data which is shared by a plurality of processes and data inherent in a process which exists during execution of one particular process and disappears when the process is finished, comprising the steps of:

forming data inherent in each process, which the process requires in relation to shared data in a data base;

storing the formed inherent data of each process in a memory;

registering an identifier of each process in a one-to-one correspondence with a pointer for the inherent data of the process, which data is stored in the memory, to a registration table for each shared data; and referring to the registration table, when each process makes reference to the shared data, thereby designating the inherent data of the process.

12. A method according to claim 11, wherein the registration tables are stored in the data base.

13. A method according to claim 12, further comprising the steps of:

referring to the registration table, when a certain process changes the shared data, thereby determining other processes making reference to the shared data; and informing the determined processes making reference to the shared data of the change in the shared data.

14. A data management method of managing shared data which is shared by a plurality of processes and data inherent in a process which exists during execution of one particular process and disappears when the process is finished, comprising the steps of:

forming data inherent in each process, which the process requires in relation to shared data in a data base;

storing the formed inherent data of each process in a memory;

registering an identifier of each process in a one-to-one correspondence with a pointer for the inherent data of the process, which data is stored in the memory, to a registration table common to a plurality of shared data; and referring to the registration table, when each process makes reference to the shared data, thereby designating the inherent data of the process.

15. A method according to claim 14, wherein the registration table is stored in the data base.

16. A method according to claim 14, further comprising the steps of:

referring to the registration table, when a certain process changes the shared data, thereby determining other processes making reference to the shared data; and informing the determined processes making reference to the shared data of the change in the shared data.

17. A data management method of managing shared data which is shared by a plurality of processes and data inherent in a process which exists during execution of one particular process and disappears when the process is finished, comprising the steps of:

forming data inherent in each process, which the process requires in relation to shared data in a data base;

storing the formed inherent data of each process in a memory;

registering an identifier of each process in a one-to-one correspondence with a pointer for the inherent data of the process, which data is stored in the memory, to an inherent registration table of the process; and referring to the registration table, when each process makes reference to the shared data, thereby designating the inherent data of the process.

18. A method according to claim 17, wherein the registration tables are stored in the memory.

* * * * *